(12) United States Patent
Ram et al.

(10) Patent No.: US 11,055,772 B1
(45) Date of Patent: Jul. 6, 2021

(54) INSTANT LENDING DECISIONS

(71) Applicants: Siddharth Ram, Menlo Park, CA (US); Richard N. Preece, San Diego, CA (US); Joseph Timothy Callinan, Jr., Campbell, CA (US); Kathy Tsitovich, Mountain View, CA (US); Eva Diane Chang, Mountain View, CA (US)

(72) Inventors: Siddharth Ram, Menlo Park, CA (US); Richard N. Preece, San Diego, CA (US); Joseph Timothy Callinan, Jr., Campbell, CA (US); Kathy Tsitovich, Mountain View, CA (US); Eva Diane Chang, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 91 days.

(21) Appl. No.: 16/198,599

(22) Filed: Nov. 21, 2018

Related U.S. Application Data

(63) Continuation of application No. 13/956,281, filed on Jul. 31, 2013, now abandoned.

(51) Int. Cl.
*G06Q 40/02* (2012.01)

(52) U.S. Cl.
CPC .................................. *G06Q 40/025* (2013.01)

(58) Field of Classification Search
CPC ........ G06N 20/20; G06N 5/048; G06N 20/00; G06Q 10/067; G06Q 40/02; G06Q 40/025

(Continued)

(56) References Cited

U.S. PATENT DOCUMENTS

| 6,182,133 | B1 * | 1/2001 | Horvitz ............... G06F 16/9574 |
| | | | 709/223 |
| 8,660,943 | B1 * | 2/2014 | Chirehdast ............. G06Q 40/00 |
| | | | 705/38 |

(Continued)

OTHER PUBLICATIONS

Dimension Reduction Using Rule Ensemble Machine Learning Methods: A Numerical Study of Three Ensemble Methods—DeMasi et al (Year: 2011).*

(Continued)

*Primary Examiner* — Christine M Behncke
*Assistant Examiner* — Mary M Gregg
(74) *Attorney, Agent, or Firm* — Ferguson Braswell Fraser Kubasta PC

(57) ABSTRACT

The method and system involves instant loan decisions by generating a risk profile of a small business (SMB). The risk profile is generated based on accounting data and other third party business management application (BMA) data of the SMB. In particular, the accounting data and other third party BMA data are retrieved from a BMA (e.g., accounting application, payroll application, tax preparation application, personnel application, etc.) as a software-as-an-service (SaaS) used by the SMB. Specifically, the risk profile represents the likelihood of the SMB to be delinquent and/or to default on a loan. The risk profile is then provided to a lender for making an expedient lending decision with respect to the SMB. In addition, statistics of lenders' lending decisions based on provided risk profiles are analyzed to generate a correlation. Accordingly, the algorithm(s) used to generate the risk profile from the accounting data and other third party BMA data are adjusted to maximize the correlation.

23 Claims, 30 Drawing Sheets

(58) Field of Classification Search
USPC .................................................. 705/38, 36
See application file for complete search history.

(56) References Cited

U.S. PATENT DOCUMENTS

| | | | |
|---|---|---|---|
| 2001/0054022 A1 | 12/2001 | Louie et al. | |
| 2005/0096950 A1* | 5/2005 | Caplan ............. | G06Q 10/06314 705/7.24 |
| 2006/0206412 A1 | 9/2006 | Van Luchene et al. | |
| 2007/0055595 A1 | 3/2007 | Keyes et al. | |
| 2008/0065486 A1 | 3/2008 | Vincent et al. | |
| 2009/0164297 A1* | 6/2009 | Bal ........................ | G06Q 30/02 705/7.12 |
| 2011/0078073 A1* | 3/2011 | Annappindi ......... | G06Q 40/025 705/38 |
| 2011/0137847 A1* | 6/2011 | Fahner ................... | G06Q 40/02 706/52 |
| 2011/0218826 A1* | 9/2011 | Birtel ..................... | G06Q 40/08 705/4 |
| 2011/0270740 A1* | 11/2011 | Pickett ................. | G06Q 40/025 705/38 |
| 2013/0226830 A1* | 8/2013 | Long ..................... | G06Q 40/00 705/36 R |
| 2013/0311233 A1* | 11/2013 | Rajman .............. | G06Q 30/0202 705/7.31 |
| 2015/0019300 A1* | 1/2015 | Porter .............. | G06Q 10/06393 705/7.39 |

OTHER PUBLICATIONS

A Neural Network Approach for Analyzing Small Business Lending Decisions by Wu et al (Year: 2000).*

* cited by examiner

300

Building the model:

Deploying the model:

| Business Management Application (BMA) Data | BMA Data Items (Variable Names used in BMA) | User-entered data | Usage/Behavioral data |
|---|---|---|---|
| Marketing Interaction -- details on which aspects of the marketing site were seen by the customer | mChannel | | x |
| | Source | | x |
| | Saw Second Page | | x |
| | Saw Start Sign Up | | x |
| | Saw Demo | | x |
| | Saw Pricing | | x |
| | Saw Sample Company | | x |
| | Saw Webinar Page | | x |
| | Saw Services Page | | x |
| | Saw FAQ | | x |
| | Visited Before Signup | | x |
| | Offer Code ID | | x |
| | Product | | x |

*FIG. 5A*

| Business Management Application (BMA) Data | BMA Data Items (Variable Names used in BMA) | User-entered data | Usage/Behavioral data |
|---|---|---|---|
| General Setup Statistics -- tasks completed during setup and time taken to complete those tasks | Signup Month | | x |
| | Signup Year Start | | x |
| | Signup Qrtr Start | | x |
| | Signup After CC Required | | x |
| | Minutes First Visit To Signup | | x |
| | Minutes Signup To Did Something | | x |
| | Minutes Signup To Finished EEs | | x |
| | Minutes Signup To Finished EEs Per EE | | x |
| | HoursSignupToHistoryCreated | | x |
| | HoursSignupToHistoryCreatedPerEE | | x |
| | HoursSignupToFirstCheck | | x |
| | HoursSignupToSecondCheck | | x |
| | HoursDidSomethingToHistoryCreated | | x |
| | HoursDidSomethingToHistoryCreatedPerEE | | x |
| | HoursFinishedEEsToHistoryCreated | | x |
| | HoursFinishedEEsToHistoryCreatedPerEE | | x |
| | HoursHistoryCreatedToFirstCheck | | x |
| | HoursFirstCheckToSecondCheck | | x |
| | TaxesSetup | | x |
| | AddedEmployee | | x |
| | FinishedAddingEmployees | | x |
| | NeedHistory | | x |
| | HistoryStatus | | x |
| | SetupCompleted | | x |
| | WroteFirstCheck | | x |

*FIG. 5B*

| Business Management Application (BMA) Data | BMA Data Items (Variable Names used in BMA) | User-entered data | Usage/Behavioral data |
|---|---|---|---|
| Customer Support – variables that summarize the customer's Customer Support interactions | GotTicket | | x |
| | TicketCount | | x |
| | TotTicketTime | | x |
| | MethodEmailCount | | x |
| | MethodLetterCount | | x |
| | MethodPhoneCount | | x |
| | MethodSiteInquiryCount | | x |
| | MethodTextChatCount | | x |
| | MethodVoicemailCount | | x |
| | EscalatedCount | | x |
| | CategoryQuestionServiceCount | | x |
| | CategoryBankVerificationCount | | x |
| | CategoryFeatureRequestCount | | x |
| | CategoryCancellationCount | | x |
| | CategoryBugCount | | x |
| | CategoryAccountSetupCount | | x |
| | CategoryComplaintCount | | x |
| | CategoryComplimentCount | | x |
| | CategoryQuestionLegalCount | | x |
| | CategoryNotificationCount | | x |
| | CategoryPDFProblemCount | | x |
| | CategorySuggestionCount | | x |
| | AvgDetailNumWords | | x |

*FIG. 5C*

| Business Management Application (BMA) Data | BMA Data Items (Variable Names used in BMA) | User-entered data | Usage/ Behavioral data |
|---|---|---|---|
| Accounting software acquisition details -- Details of how the accounting software was first acquired, as well as start up information | COMPANY_ID | | |
| | PLAN_NAME | | x |
| | BUY_TRY_PATH | | x |
| | TRIAL_CREATE_DATE | | x |
| | DISCOUNT_TYPE | | x |
| | DISCOUNT_END | | x |
| | BILLED_USER_COUNT | | x |
| | STARTUP_INTERVIEW_USER_ROLE | | x |
| | TOTAL_USER_COUNT | | x |
| | TRIAL_END_DATE | | x |
| | ENTERED_CC_DATE | | x |
| | NUM_OLB_ACCTS_CONNECTED | | x |
| | NEXT_CHARGE_DATE | | x |
| | HAS_SEM_TRACKING | | x |
| | BROWSER_CREATED_WITH | | x |
| | SKU | | x |
| | FIRST_CHARGE_DATE | | x |
| | ORIGINAL_SKU | | x |
| | CREATE_DATE | | x |
| | LAST_MODIFY_DATE | | x |
| | COMPANY_STATUS | | x |
| | QB_IMPORT_TXNS | | x |
| | HAS_QBDT_AUTH_ID | | x |
| | TEK_LOGIN_CREATED | | x |
| | LAST_ALERT_EMAIL_PROCESS_TIME | | x |

*FIG. 5D*

| Business Management Application (BMA) Data | BMA Data Items (Variable Names used in BMA) | User-entered data | Usage/ Behavioral data |
|---|---|---|---|
| Business Statistics | NAME_LIST_SIZE | x | |
| | ACCOUNT_LIST_SIZE | x | |
| | ITEM_LIST_SIZE | x | |
| | NUM_EMPLOYEES_MONTH | x | |

*FIG. 5E*

| Business Management Application (BMA) Data | BMA Data Items (Variable Names used in BMA) | User-entered data | Usage/Behavioral data |
|---|---|---|---|
| Money in/out | AMOUNT_IN | x | |
| | AMOUNT_OUT | x | |
| | NUM_TRANSACTIONS_IN | x | |
| | NUM_TRANSACTIONS_OUT | x | |
| | NUM_CUSTOMERS_MONTH | x | |
| | NUM_VENDORS_MONTH | x | |
| | AMOUNT_IN_TRAIL12MO | x | |
| | AMOUNT_OUT_TRAIL12MO | x | |
| | NUM_TRANSACTIONS_IN_TRAIL12MO | x | |
| | NUM_TRANSACTIONS_OUT_TRAIL12MO | x | |
| | NUM_CUSTOMERS_TRAIL12MO | x | |
| | NUM_VENDORS_TRAIL12MO | x | |
| | NUM_CUSTOMERS_REPEAT_TRAIL12MO | x | |
| | NUM_TRANSACTIONS_IN_REPEAT_TRAIL12MO | x | |
| | AMOUNT_IN_REPEAT_TRAIL12MO | x | |
| | PERC_NUM_CUSTOMERS_REPEAT_TRAIL12MO | x | |
| | PERC_NUM_TRANSACTIONS_IN_REPEAT_TRAIL12MO | x | |
| | PERC_AMOUNT_IN_REPEAT_TRAIL12MO | x | |

*FIG. 5F*

| Business Management Application (BMA) Data | BMA Data Items (Variable Names used in BMA) | User-entered data | Usage/ Behavioral data |
|---|---|---|---|
| Underwriting financial statistics | AR_DAYS_TURNOVER | x | |
| | AP_DAYS_TURNOVER | x | |
| | CPLTD | x | |
| | CURRENT_RATIO | x | |
| | DIVIDENDS | x | |
| | EBITDA | x | |
| | EBITDAR | x | |
| | FIXED_CHARGES | x | |
| | FIXED_CHARGE_COVERAGE_RATIO | x | |
| | GROSS_MARGIN | x | |
| | INTEREST_COVERAGE | x | |
| | INVENTORY_DAYS_TURNOVER | x | |
| | NET_MARGIN | x | |
| | TOTAL_LEVERAGE_TNW | x | |
| | TOTAL_LEVERAGE_EBITDA | x | |
| | NET_CASH_FLOW | x | |
| | NET_WORTH | x | |
| | TANGIBLE_NET_WORTH | x | |
| | YOY_SALES_GROWTH | x | |
| | YOY_PROFIT_GROWTH | x | |

*FIG. 5G*

| Business Management Application (BMA) Data | BMA Data Items (Variable Names used in BMA) | User-entered data | Usage/Behavioral data |
|---|---|---|---|
| Accounting software usage details | NUM_LOGINS_QTR | | x |
| | LAST_LOGGED_IN_DATE | | x |
| | NUM_LOGINS_MONTH_01 | | x |
| | NUM_LOGINS_MONTH_02 | | x |
| | NUM_LOGINS_MONTH_03 | | x |
| | NUM_LOGINS_MONTH_04 | | x |
| | NUM_LOGINS_MONTH_05 | | x |
| | NUM_LOGINS_MONTH_06 | | x |
| | NUM_LOGINS_MONTH_07 | | x |
| | NUM_LOGINS_MONTH_08 | | x |
| | NUM_LOGINS_MONTH_09 | | x |
| | NUM_LOGINS_MONTH_10 | | x |
| | NUM_LOGINS_MONTH_11 | | x |
| | NUM_LOGINS_MONTH_12 | | x |
| | NUM_LOGINS | | x |
| | NUM_LOGOUTS | | x |
| | NUM_LOGINS_FROM_MOBILE_DEVICE | | x |
| | NUM_ACCOUNTS | | x |
| | NUM_EMPLOYEES | | x |
| | NUM_CUSTOMERS | | x |
| | NUM_MEMORIZED_REPORTS | | x |
| | NUM_CHECKS | | x |
| | NUM_INVOICES | | x |
| | NUM_RECVD_PAYMENTS | | x |
| | NUM_BILLS | | x |
| | NUM_ESTIMATES | | x |
| | NUM_PURCHASE_ORDERS | | x |
| | NUM_PREF_CHANGED | | x |
| | NUM_EXPORTED_LISTS | | x |
| | NUM_SENT_EMAIL_INVITATION | | x |
| | NUM_ITEMS | | x |
| | LOGO_ADDED | | x |
| | NUM_RECONCILED | | x |

*FIG. 5H*

| | | | |
|---|---|---|---|
| Accounting software usage details | NUM_CREDIT_CARDS | | x |
| | NUM_GENERAL_JOURNALS | | x |
| | NUM_CREDIT_CARD_CREDITS | | x |
| | NUM_BILL_CREDITS | | x |
| | NUM_CHARGE_CREDITS | | x |
| | NUM_BILL_CHECKS | | x |
| | NUM_BILL_CREDIT_CARDS | | x |
| | NUM_CHARGES | | x |
| | NUM_TRANSFERS | | x |
| | NUM_REIMB_CHARGES | | x |
| | NUM_TIME_CHARGES | | x |
| | NUM_CASH_PURCHASES | | x |
| | NUM_CASH_SALES | | x |
| | NUM_CREDIT_MEMOS | | x |
| | NUM_CREDIT_REFUNDS | | x |
| | NUM_PAYROLL_ADJUSTMENTS_V2 | | x |
| | NUM_PAYROLL_CHECKS | | x |
| | NUM_TAX_PAYMENTS | | x |
| | NUM_PAYROLL_REFUNDS | | x |
| | NUM_VENDORS | | x |
| | NUM_DEPARTMENTS | | x |
| | NUM_TRANSACTIONS | | x |
| | NUM_STATEMENTS | | x |
| | NUM_USERS | | x |
| | NUM_BUDGETS | | x |
| | NUM_OLB_FINANCIAL_INSTITUTIONS | | x |
| | NUM_REMINDERS | | x |
| | NUM_INVENTORY_QTY_ADJMTS | | x |
| | NUM_OLB_MANUAL | | x |
| | NUM_OLB_SETUP | | x |
| | NUM_OLB_DISABLE | | x |
| | NUM_OLB_AUTO | | x |
| | NUM_OLB_ACCEPT | | x |
| | NUM_EMAILED_INVOICES | | x |
| | NUM_EMAILED_STATEMENTS | | x |
| | NUM_UPLOAD_FILES | | x |

*FIG. 5I*

| Business Management Application (BMA) Data | BMA Data Items (Variable Names used in BMA) | User-entered data | Usage/Behavioral data |
|---|---|---|---|
| Subscription details -- information concerning the customer's subscription of the payroll product | TrialStartDate | | x |
| | SubscriptionDate | | x |
| | CancelationDate | | x |
| | SubscriptionPlan | | x |
| | AccountStatus | | x |
| | AcquisitionChannel | | x |
| | Discounts/PromotionsApplied | | x |
| | Upgrade_Date | | x |

*FIG. 5J*

| Business Management Application (BMA) Data | BMA Data Items (Variable Names used in BMA) | User-entered data | Usage/ Behavioral data |
|---|---|---|---|
| Subscription billing details -- details on subscription billing | DateOf1stBill2ndBill3rdBill | | x |
| | ChargeAmountOf1stBill2ndBill3rdBill | | x |
| | #OfBillings | | x |
| | TimeBetweenSignup&1stBill | | x |
| | TimeBetween1stCheckAnd1stBill | | x |
| | TimeBetweenSignupAndLastBill | | x |
| | TimeBetween1stCheckAndLastBill | | x |
| | TimeSinceLastCheck | | x |
| | PastDueInvoices | | x |
| Payroll processing details -- details of customer's payroll processing | DateOf1stPayroll2ndPayroll3rdPayroll | | x |
| | NumberOfEmployeesIn1stPayroll2ndPayroll3rdPayroll | x | |
| | TotalAmountOfPayrollProcessedIn1stPayroll2ndPayroll3rdPayroll | x | |
| | #OfLoginsInLast30Days | | x |
| | AverageLogins | | x |
| | #OfChecksInLast30Days | x | |
| | Average#OfChecks | x | |
| | #OfEmployeesPaidInLast30Days | x | |
| | Aveage#OfEmployeesPaid | x | |
| | TimeSinceLastRaise | x | |
| Attrition details -- information concerning customers who leave the product | CancelRequestDate | | x |
| | MethodOfInitiatingDisconnection | | x |
| | CancelReason | | x |
| | FutureMethod | | x |
| | NpsForCancellers | | x |
| Payroll setup Statistics -- set up information for customers using Online Payroll | Date(S)ClickedOnSet Up Payroll | | x |
| | No.OfTimesClickedOnSkip For NowDuringTheSetupProcess | | x |
| | Date(S)EmployeesWereAdded | | x |
| | FlagForHavingPaidEmployeesThisYear | | x |
| | FlagForHavingMoreThanOneOfficeLocationWithEmployees | | x |
| | PayScheduleForEachEmployee | x | |
| | DateEmployeesSetupCompleted | | x |
| | DateTaxesSetupCompleted | | x |
| | Date(S)ClickedOnTime Tracking | | x |
| | DateTime TrackingWasActivated | | x |

*FIG. 5K*

| Business Management Application (BMA) Data | BMA Data Items (Variable Names used in BMA) | User-entered data | Usage/ Behavioral data |
|---|---|---|---|
| Customer details -- information on customers who use BMA | RevenueInTheLast30Days | x | |
| | AverageRevenue | x | |
| | #InvoicesInTheLast30Days | x | |
| | Average#OfInvoices | x | |
| | #OfCustomersInCustomerListNow | x | |
| | #OfCustomersVs90DaysAgo | x | |
| | TimeBetweenQBAndIOP | | x |
| Pattern changes -- changes in usage | VeryRecentActivityVsWhatsNormalForYou | | x |
| Transaction Statistics | Lifetime Transaction Volume | x | |
| | 30 day returns | x | |
| | Lifetime Returns | x | |
| | Sales Count Last 30 days | x | |
| | Transaction count-last 30 | x | |
| | Total Trans Volume | x | |
| Chargebacks Statistics | Chargeback 30 days | x | |
| | Chargeback lifetime | x | |
| | ChgBk Count Life | x | |
| Age Statistics | Merchant Age | | x |
| | Merchant Processing Age | | x |
| | Prior Merchant Age | x | |

*FIG. 5L*

| BMA Data Items (Variable Names used in BMA) | Description |
|---|---|
| mChannel | Marketing channel |
| Source | Source |
| Saw Second Page | Flag indicating if second page was seen |
| Saw Start Sign Up | Flag indicating if start sign-up was seen |
| Saw Demo | Flag indicating if demo was seen |
| Saw Pricing | Flag indicating if pricing was seen |
| Saw Sample Company | Flag indicating if sample company was seen |
| Saw Webinar Page | Flag indicating if webinar page was seen |
| Saw Services Page | Flag indicating if services page was seen |
| Saw FAQ | Flag indicating if FAQs were seen |
| Visited Before Signup | Flag indicating if marketing pages were visited before signup |
| Offer Code ID | Offer code |
| Product | Product |
| Signup Month | Month when signed up |
| Signup Year Start | Start of year of sign up |
| Signup Qrtr Start | Start of quarter of sign up |
| Signup After CC Required | Sign up after CC |
| Minutes First Visit To Signup | Minutes from first visit to signup |
| Minutes Signup To Did Something | Minutes from sign up to doing something |
| Minutes Signup To Finished EEs | Minutes from sign up to finished entering employees |
| Minutes Signup To Finished EEs Per EE | Minutes Signup To Finished EEs divided by total numbe of employees |
| HoursSignupToHistoryCreated | Hours from sign up to history created |
| HoursSignupToHistoryCreatedPerEE | HoursSignupToHistoryCreatedPerEE divided by total number of employees |
| HoursSignupToFirstCheck | Hours from sign up to first check |
| HoursSignupToSecondCheck | Hours from sign up to second check |
| HoursDidSomethingToHistoryCreated | Hours from doing something to history created |
| HoursDidSomethingToHistoryCreatedPerEE | HoursDidSomethingToHistoryCreated divided by total number of employees |
| HoursFinishedEEsToHistoryCreated | Hours from finished entering employees to history created |
| HoursFinishedEEsToHistoryCreatedPerEE | HoursFinishedEEsToHistoryCreated divided by total number of employees |
| HoursHistoryCreatedToFirstCheck | Hours from history created to first check |
| HoursFirstCheckToSecondCheck | Hours from first check to second check |
| TaxesSetup | Flag indicating whether taxes were set up |
| AddedEmployee | Flag indicating whether employees were added |
| FinishedAddingEmployees | Flag indicating whether finished adding employees |

*FIG. 6A*

| BMA Data Items (Variable Names used in BMA) | Description |
|---|---|
| GotTicket | Flag indicating if got a support ticket |
| TicketCount | Number of tickets |
| TotTicketTime | Total customer support time |
| MethodEmailCount | Number of times email was used |
| MethodLetterCount | Number of times letters were used |
| MethodPhoneCount | Number of times phone was used |
| MethodSiteInquiryCount | Number of times site inquiries were made |
| MethodTextChatCount | Number of times text/chat was used |
| MethodVoicemailCount | Number of times voicemail was used |
| EscalatedCount | Number of escalations |
| CategoryQuestionServiceCount | Number of questions about service |
| CategoryBankVerificationCount | Number of bank verifications |
| CategoryFeatureRequestCount | Number of feature requests |
| CategoryCancellationCount | Number of cancellations |
| CategoryBugCount | Number of bugs reported |
| CategoryAccountSetupCount | Number of account setup questions |
| CategoryComplaintCount | Number of complaints |
| CategoryComplimentCount | Number of compliments |
| CategoryQuestionLegalCount | Number of legal questions |
| CategoryNotificationCount | Number of notifications |
| CategoryPDFProblemCount | Number of problems with PDF |
| CategorySuggestionCount | Number of suggestions |
| AvgDetailNumWords | Average number words in details |
| State | Company's location state |
| isKnownAddress | Flag indicating if address is known |
| isBillingAddBizAddress | Flag indicating if billing address is same as business address |
| EmailDomain | Email domain |
| CCardType | Credit card type |
| BillingMethod | Billing method |
| Industry | Industry |
| IIDirectDeposit | Flag indicating if direct deposit is desired at Initial Interview point |
| IIMaybe941Filer | Flag indicating if might be a 941 filer |
| IIHavePaidTimeOff | Flag indicating if gives paid time off |
| IIMoreThanOneWorkLocation | Flag indicating if have more than one work location |
| IITimeTracking | Flag indicating if tracking time |
| IIHaveContractor | Flag indicating if have contractors |
| IIContractorsOnly | Flag indicating if have only contractors |

*FIG. 6B*

| BMA Data Items (Variable Names used in BMA) | Description |
| --- | --- |
| IIDDPaperCheckWhileWaiting | Flag indicating whether to use paper checks while waiting for direct deposit set up |
| numEEsWithEarlyChecks | Number of employees with early checks |
| checkAmountMax | Max check amount |
| checkAmountMin | Min check amount |
| checkAmountSpread | Diff between max and min check amounts |
| checkAmountRatio | Ratio of max to min check amounts |
| pctRoundDollarChecks | Percent of checks that are round dollars (no cents) |
| pctRoundHundredDollarChecks | Percent of checks that are multiple of $100 |
| pctZeroDollarChecks | Percent of checks with zero dollars |
| pctEEsWithHistory | Percent of employees that have a history |
| pctEEsInFirstPayroll | Percent of employees in first payroll |
| multiplePeriodTypes | Flag indicating if have multiple period types |
| usedDeductions | Flag indicating if deductions where used |
| usedDD | Flag indicating if direct deposit is used |
| hasPhantomEEs | Flag indicating if has phantom employees |
| pctPartialEEs | Percent of employees with partial information |
| numCompleteEEs | Number of employees with complete information |
| pctHasBirthDate | Percent of employees that have a birthdate entered |
| pctHasSocial | Percent of employees that have a social security number entered |
| pctHasBankInfo | Percent of employees that have bank info entered |
| pctHasPaycheck | Percent of employees that have a paycheck |
| numTaxState | Number of states where payroll taxes need to be paid |
| numTaxType | Number of payroll taxes that need to be paid |
| hasTaxDefaults | Flag indicating if using tax defaults |
| isNewEmployer | Flag indicating if is a new employer |
| isAcquiredCompany | Flag indicating if is an aquired company |
| taxRateSUI | Tax rate for SUI |
| taxRateSDI | Tax rate for SDI |
| taxRateUHI | Tax rate for UHI |
| taxRateOTHER | Tax rate for Other |
| DeletedPaycheck | Flag indicating if deleted a paycheck |
| ModifiedPaycheck | Flag indicating if modified a paycheck |
| DeletedTaxPayment | Flag indicating if deleted a tax payment |
| ModifiedTaxPayment | Flag indicating if modified a tax payment |
| CSlogin | Number of system logins by customer support agent c behalf of company |
| ModifyCompFilingName | Flag indicating if modified company filing name |

*FIG. 6C*

| BMA Data Items (Variable Names used in BMA) | Description |
| --- | --- |
| ModifyCompBankAccountNumber | Flag indicating if modified bank acct number |
| ModifyCompBankRoutingNumber | Flag indicating if modified bank routing number |
| ModifyCompServiceLevel | Flag indicating if modified service level |
| ModifyCompStateTaxRate | Flag indicating if modified state tax rate |
| DeleteCompStateTaxRate | Flag indicating if deleted state tax rate |
| ModifyCompDepositSchedule | Flag indicating if deposit schedule was modified |
| DeleteCompDepositSchedule | Flag indicating if deposit schedule was deleted |
| ModifyFormsUsageDate | Flag indicating if forms usage date was modified |
| PlaceHold | Flag indicating if a hold was placed |
| RemoveHold | Flag indicating if a hold was removed |
| ModifyEEBankAccountNumber | Flag indicating if employee bank acct number was modified |
| ModifyEEBankRoutingNumber | Flag indicating if employee bank routing number was modified |
| SocialSecurityMedicareEEVettingFailure | Flag indicating if employee social security or Medicare vetting failed |
| PriorQrterEmployerTaxesVettingFailure | Flag indicating if prior quarter employer taxes vetting failed |
| EEPaycheckHistorySuccess | Flag indicating success of employee paycheck history |
| CurrentQrterPayrollTotalsSuccess | Flag indicating success of current quarter payroll tota |
| PriorQrterEmployerTaxesSuccess | Flag indicating success of prior quarters employer tax |
| DeletedContractorPayment | Flag indicating of contractor payment was deleted |
| ModifiedContractorPayment | Flag indicating of contractor payment was modified |
| AddCompDepositSchedule | Flag indicating if deposit schedule was added |
| AddCompStateTaxRate | Flag indicating if state tax rate was added |
| UnuslDirectDepositActivity | Flag indicating unusual direct deposit activity |
| ModifyContractorBankAccountNumber | Flag indicating if contractor bank acct number was modified |
| ModifyContractorBankRoutingNumber | Flag indicating if contractor bank routing number was modified |
| ModifyWorkLocationAddress | Flag indicating if work location address was modified |
| ModifyEEWorkLocation | Flag indicating if employee work location was modifie |
| EditJITData | Flag indicating if JIT data was edited |
| ModifiedOverrideToFUTArate | Flag indicating if Override to FUTA rate was modified |
| TerminatedService | Flag indicating if service was terminated |
| VerifyAddressSuccess | Flag indicating if address verification was successful |
| VerifyAddressFailure | Flag indicating if address verification failed |
| AddressVerificationOverride | Flag indicating if address verification was overridden |
| AddressVerificationReset | Flag indicating if address verification was reset |
| EnableAfterTheFactHistory | Flag indicating if after the fact history was enabled |

*FIG. 6D*

| BMA Data Items (Variable Names used in BMA) | Description |
|---|---|
| ModifyAccountAccess | Flag indicating if account access was modified |
| EntityChangedCopiedToNewEntity | Flag indicating if entity was changed and copied to new entity |
| UserIDrecovery | Flag indicating user ID recovery |
| UserIDchange | Flag indicating a change in user ID |
| DeclinedSUIrateUpdate | Flag indicating if SUI rate update was declined |
| AcceptedSUIrateUpdate | Flag indicating if SUI rate update was accepted |
| ModifyContactPhoneNumber | Flag indicating if contact phone number was modified |
| ModifyCompEmailAddress | Flag indicating if email address was modified |
| ModifyCompNamedStatus | Flag indicating if named status was modified |
| AddAddOn | Flag indicating if add on was added |
| RemoveAddOn | Flag indicating if add on was removed |
| ChangeBasePackage | Flag indicating if base package was changed |
| ReanimateService | Flag indicating if service was reanimated |
| ModifyCreditCardInformation | Flag indicating if credit card information was modified |
| ModifyContactName | Flag indicating if contact name was modified |
| ModifyCompCreditLimit | Flag indicating if credit limit was modified |
| DeleteEE | Flag indicating if an employee was deleted |
| EditTimesheetShiftAfterPaycheck | Flag indicating if timesheet shift was edited after paycheck |
| DeleteTimesheetShiftAfterPaycheck | Flag indicating if timesheet shift was deleted after paycheck |
| EnableTaxMinder | Flag indicating if tax minder is enabled |
| DisableTaxMinder | Flag indicating if tax minder is disabled |
| GeneratedSecurityKey | Flag indicating if security key was generated |
| SentSecurityKeyInVoice | Flag indicating if security key was sent via voice |
| SentSecurityKeyInSMS | Flag indicating if security key was sent via SMS |
| SentSecurityKeyInEmail | Flag indicating if security key was sent via email |
| SecurityKeyValidationFailure | Flag indicating if security key validation failed |
| SecurityKeyValidationSuccessful | Flag indicating if security key validation was successful |
| SecurityKeyValidationFailureAndLockout | Flag indicating if security key validation failed resulting lockout |
| SecurityKeyUnlocked | Flag indicating if security key is unlocked |
| ModifyBillingID | Flag indicating if billing id was modified |
| ModifyNextBillingDate | Flag indicating if next billing date was modified |
| TrialStartDate | trial start date |
| SubscriptionDate | subscription date |
| CancelationDate | cancelation date |
| SubscriptionPlan | subscription plan (e.g. basic, plus) |
| AccountStatus | account status (e.g. active, suspended) |

*FIG. 6E*

| BMA Data Items (Variable Names used in BMA) | Description |
|---|---|
| AcquisitionChannel | acquisition channel |
| Discounts/PromotionsApplied | discounts/promotions applied |
| Upgrade_Date | upgrade_date (if applicable) |
| DateOf1stBill2ndBill3rdBill | date of 1st bill, 2nd bill, 3rd bill etc. |
| ChargeAmountOf1stBill2ndBill3rdBill | charge amount of 1st bill, 2nd bill, 3rd bill etc. |
| #OfBillings | # of billings |
| TimeBetweenSignup&1stBill | time between signup & 1st bill |
| TimeBetween1stCheckAnd1stBill | time between 1st check and 1st bill |
| TimeBetweenSignupAndLastBill | time between signup and last bill |
| TimeBetween1stCheckAndLastBill | time between 1st check and last bill |
| TimeSinceLastCheck | time since last check |
| PastDueInvoices | past due invoices |
| DateOf1stPayroll2ndPayroll3rdPayroll | date of 1st payroll, 2nd payroll, 3rd payroll etc. |
| NumberOfEmployeesIn1stPayroll2ndPayroll3rdPayroll | number of employees in 1st payroll, 2nd payroll, 3rd payroll etc. |
| TotalAmountOfPayrollProcessedIn1stPayroll2ndPayroll3rdPayroll | total amount of payroll processed in 1st payroll, 2nd payroll, 3rd payroll etc. |
| #OfLoginsInLast30Days | # of logins in last 30 days |
| AverageLogins | average logins |
| #OfChecksInLast30Days | # of checks in last 30 days |
| Average#OfChecks | average # of checks |
| #OfEmployeesPaidInLast30Days | # of employees paid in last 30 days |
| Aveage#OfEmployeesPaid | average # of employees paid |
| TimeSinceLastRaise | time since last raise |
| CancelRequestDate | cancel request date |
| MethodOfInitiatingDisconnection | method of initiating disconnection (e.g. called agent, exit interview in-product, system-generated) |
| CancelReason | cancel reason |
| FutureMethod | future method |
| NpsForCancellers | NPS for cancellers |
| Date(S)ClickedOnSet Up Payroll | date(s) clicked on "Set up payroll" |
| No.OfTimesClickedOnSkip For NowDuringTheSetupProcess | no. of times clicked on "skip for now" during the setup process |
| Date(S)EmployeesWereAdded | date(s) employees were added |
| FlagForHavingPaidEmployeesThisYear | flag for having paid employees this year |
| FlagForHavingMoreThanOneOfficeLocationWithEmployees | flag for having more than one office location with employees |
| PayScheduleForEachEmployee | pay schedule for each employee (every week, every other week, every month etc.) |
| DateEmployeesSetupCompleted | date employees setup completed |

*FIG. 6F*

| BMA Data Items (Variable Names used in BMA) | Description |
| --- | --- |
| DateTaxesSetupCompleted | date taxes setup completed |
| Date(S)ClickedOnTime Tracking | date(s) clicked on "time tracking" |
| DateTime TrackingWasActivated | date "time tracking" was activated |
| RevenueInTheLast30Days | revenue in the last 30 days |
| AverageRevenue | average revenue |
| #InvoicesInTheLast30Days | # invoices in the last 30 days |
| Average#OfInvoices | average # of invoices |
| #OfCustomersInCustomerListNow | # of customers in customer list now |
| #OfCustomersVs90DaysAgo | # of customers vs 90 days ago |
| TimeBetweenQBAndIOP | time between QB and IOP |
| VeryRecentActivityVsWhatsNormalForYou | very recent activity vs. what's normal for you |
| Lifetime Transaction Volume | Sum of lifetime volume |
| 30 day returns | Sum of $ returns over last 30 days |
| Lifetime Returns | Sum of $ returns over lifetime |
| Sales Count Last 30 days | Sales count in last 30 days |
| Transaction count-last 30 | Count of total sales in last 30 days |
| Total Trans Volume | total sales amount for current day |
| Chargeback 30 days | Total $ chargebacks in last 30 days |
| Chargeback lifetime | Total $ chargebacks over lifetime |
| ChgBk Count Life | Total chargeback counts over lifetime |
| Merchant Age | days since sign up |
| Merchant Processing Age | days since first transaction |
| Prior Merchant Age | months as a business prior to sign up |
| COMPANY_ID | Identifier |
| PLAN_NAME | Name of the plan - Plus2010Monthly, PlusMonthly, SimpleStart2010Monthly, V7DefaultMonthlyPlan |
| BUY_TRY_PATH | Path for buying - import from desktop, trial page, buy page link |
| TRIAL_CREATE_DATE | Date Trial started |
| DISCOUNT_TYPE | Type of discount offered - No discount, twenty percen ten percent Unlimited |
| DISCOUNT_END | How many days for discount to end |
| BILLED_USER_COUNT | Number of users for billing purposes |
| STARTUP_INTERVIEW_USER_ROLE | role of the person who started using the product |
| TOTAL_USER_COUNT | Total number of users |
| TRIAL_END_DATE | Trial end date |
| ENTERED_CC_DATE | When credit card details were entered |
| NUM_OLB_ACCTS_CONNECTED | Number of online banking accounts that are connecte |

*FIG. 6G*

| BMA Data Items (Variable Names used in BMA) | Description |
|---|---|
| NEXT_CHARGE_DATE | Next date CC will be charged |
| HAS_SEM_TRACKING | Flag indicating whether company has SEM tracking |
| BROWSER_CREATED_WITH | Which browser was used to sign up: Other=0, IE=100 Firefox=200, Safari=300 |
| SKU | QBO Product SKU |
| FIRST_CHARGE_DATE | First date when company was charged for QBO |
| ORIGINAL_SKU | Original SKU that customer signed up with, later coul migrate to another |
| CREATE_DATE | QBO account start date |
| LAST_MODIFY_DATE | Company record last modified date |
| COMPANY_STATUS | Status - Subscriber, Trialer, Cancelled |
| QB_IMPORT_TXNS | Whether transactions have been imported from QBC |
| HAS_QBDT_AUTH_ID | Flag indicating whether QBDT auth_id exists |
| TEK_LOGIN_CREATED | Flag indicating whether TEK login has been created |
| LAST_ALERT_EMAIL_PROCESS_TIME | when the last alert email was processed |
| COMPANY_NAME | Name of the company-Available directly through IPP |
| INDUSTRY_TYPE | Type of industry |
| STATE | State where company is located-Available directly through IPP |
| EMAIL_DOMAIN | Email domain of the company's email address-Available directly through IPP |
| AREA_CODE | Company's area code-Available directly through IPP |
| ENTERED_EIN | Flag indicating whether EIN has been entered-Availal directly through IPP |
| FISCAL_START_MONTH | First month of the company's fiscal year-Available directly through IPP |
| INCOME_TAX_START_MONTH | First month of year that company reports income tax for (either same as fiscal start month or January)-Available directly through IPP |
| LAST_MODIFY_USER_ID | Which userid last modified a record |
| TAX_FORM | Specific category of the tax filer – SOLE Proprietor=1, Partnership=2, S Corporation=3, Corporation=4, Organization=5, Other=6-Available directly through I |
| TIMEZONE | company's timezone |
| HAS_WEBSITE_URL | Does the company have a website URL-Available directly through IPP |
| HAS_DNB_NUM | Has a D&B number determined from external data |
| DNB_SALESVOLUME | D&B sales volume determined from external data |
| DNB_YEARSTARTED | D&B year started determined from external data |
| NAME_LIST_SIZE | The total number of employees, vendors, and customers entered-Available directly through IPP |

*FIG. 6H*

| BMA Data Items (Variable Names used in BMA) | Description |
| --- | --- |
| ACCOUNT_LIST_SIZE | The number of accounts entered-Available directly through IPP |
| ITEM_LIST_SIZE | The number of items entered-Available directly throu IPP |
| NUM_EMPLOYEES_MONTH | Number of employees on the books last month- Computable from IPP data |
| AMOUNT_IN | Total amount in last month- Computable from IPP da |
| AMOUNT_OUT | Total amount outbound last month- Computable fron IPP data |
| NUM_TRANSACTIONS_IN | # incoming transactions last month- Computable fron IPP data |
| NUM_TRANSACTIONS_OUT | # outgoing transactions last month- Computable fron IPP data |
| NUM_CUSTOMERS_MONTH | Number of customers paid last month- Computable from IPP data |
| NUM_VENDORS_MONTH | Number of vendors paid last month- Computable fro IPP data |
| AMOUNT_IN_TRAIL12MO | Total amount coming in in the last 12 months- Computable from IPP data |
| AMOUNT_OUT_TRAIL12MO | Total amount outbound in the last 12 months- Computable from IPP data |
| NUM_TRANSACTIONS_IN_TRAIL12MO | Number of transactions with money coming in in the last 12 months- Computable from IPP data |
| NUM_TRANSACTIONS_OUT_TRAIL12MO | Number of transactions with money going out in the last 12 months- Computable from IPP data |
| NUM_CUSTOMERS_TRAIL12MO | Total number of distinct customers in the last 12 months- Computable from IPP data |
| NUM_VENDORS_TRAIL12MO | Total number of distinct vendors in the last 12 month Computable from IPP data |
| NUM_CUSTOMERS_REPEAT_TRAIL12MO | This is the number of customers in this month that were already customers in the preceding 12 months- Computable from IPP data |
| NUM_TRANSACTIONS_IN_REPEAT_TRAIL12MO | The number of transactions these repeated customer accounted for- Computable from IPP data |
| AMOUNT_IN_REPEAT_TRAIL12MO | The $ amount in these repeated customers represented- Computable from IPP data |
| PERC_NUM_CUSTOMERS_REPEAT_TRAIL12MO | The percent of all customers that month that are repeats from the previous 12 months- Computable from IPP data |
| PERC_NUM_TRANSACTIONS_IN_REPEAT_TRAIL12MO | The percent of all transactions that month that are from customers that are repeats from the previous 1. months- Computable from IPP data |

*FIG. 6I*

| BMA Data Items (Variable Names used in BMA) | Description |
|---|---|
| PERC_AMOUNT_IN_REPEAT_TRAIL12MO | The percent of the amount in that month that is from customers that are repeats from the previous 12 months. |
| AR_DAYS_TURNOVER | (Accounts Receivable/Annual Sales)*365 days- Computable from IPP data |
| AP_DAYS_TURNOVER | (Accounts Payable/Annual Cost of Goods Sold)*365 days- Computable from IPP data |
| CPLTD | Amount of loan princial $ scheduled to be repaid within 12 months- Computable from IPP data |
| CURRENT_RATIO | Current Assets/Current Liabilities- Computable from IPP data |
| DIVIDENDS | (Retaining Earings FY '11 + Net Income '12) - Retained Earnings '12- Computable from IPP data |
| EBITDA | Net Income + Interest Expense + Taxes + Depreciation Expense + Amortization Expense- Computable from IPP data |
| EBITDAR | Net Income + Interest Expense + Taxes + Depreciation Expense + Amortization Expense + Rent Expense- Computable from IPP data |
| FIXED_CHARGES | (CPLTD+Interest Expense+Dividends+Taxes)- Computable from IPP data |
| FIXED_CHARGE_COVERAGE_RATIO | (EBITDA-Internally Financed Capex)/Fixed Charges- Computable from IPP data |
| GROSS_MARGIN | Gross Profit/Revenue- Computable from IPP data |
| INTEREST_COVERAGE | (EBITDA/Interest Expense)- Computable from IPP data |
| INVENTORY_DAYS_TURNOVER | (Inventory/Annual Cost of Goods Sold)*365 days- Computable from IPP data |
| NET_MARGIN | Net Income/Revenue- Computable from IPP data |
| TOTAL_LEVERAGE_TNW | Total Interest Bearing Debt/TNW- Computable from IPP data |
| TOTAL_LEVERAGE_EBITDA | Total Interest Bearing Debt/EBITDA- Computable from IPP data |
| NET_CASH_FLOW | (EBITDA-Internally Financed Capex - Fixed Charges)- Computable from IPP data |
| NET_WORTH | Total Assets - Total Liabilities- Computable from IPP data |
| TANGIBLE_NET_WORTH | Total Assets - Intangibles - Affiliated A/R - Total Liabilities- Computable from IPP data |
| YOY_SALES_GROWTH | (FY '12 Revenue/FY '11 Revenue) -1 - Computable from IPP data |
| YOY_PROFIT_GROWTH | (FY '12 Net Income / FY '11 Net Income) -1 - Computable from IPP data |
| NUM_LOGINS_QTR | number of logins last quarter |

*FIG. 6J*

| BMA Data Items (Variable Names used in BMA) | Description |
|---|---|
| NUM_LOGINS_MONTH_01 | Number of logins in January |
| NUM_LOGINS_MONTH_02 | Number of logins in February |
| NUM_LOGINS_MONTH_03 | Number of logins in March |
| NUM_LOGINS_MONTH_04 | Number of logins in April |
| NUM_LOGINS_MONTH_05 | Number of logins in May |
| NUM_LOGINS_MONTH_06 | Number of logins in June |
| NUM_LOGINS_MONTH_07 | Number of logins in July |
| NUM_LOGINS_MONTH_08 | Number of logins in August |
| NUM_LOGINS_MONTH_09 | Number of logins in September |
| NUM_LOGINS_MONTH_10 | Number of logins in October |
| NUM_LOGINS_MONTH_11 | Number of logins in November |
| NUM_LOGINS_MONTH_12 | Number of logins in December |
| NUM_LOGINS | number of times customer logs into a company. 5 users logging in once == 1 user logging in 5 times. |
| NUM_LOGOUTS | When customer clicks on Log Out, number of times customer logs out of a company. 5 users logging out once == 1 user logging out 5 times. |
| NUM_LOGINS_FROM_MOBILE_DEVICE | Number of logins from a mobile browser (phone, tablet). Not from the app. |
| NUM_ACCOUNTS | Number of times customer added accounts last month- Computable from IPP data |
| NUM_EMPLOYEES | Number of times customer added employees last month- Computable from IPP data |
| NUM_CUSTOMERS | Number of times customer added customers last month. Includes customers imported from lists.- Computable from IPP data |
| NUM_MEMORIZED_REPORTS | Number of times customer created memorized reports last month |
| NUM_CHECKS | Number of times customer created (saved) checks last month- Computable from IPP data |
| NUM_INVOICES | Number of times customer created (saved) invoices last month- Computable from IPP data |
| NUM_RECVD_PAYMENTS | Number of times customer 'received payments' last month- Computable from IPP data |
| NUM_BILLS | Number of times customer 'Entered bills' in Vendor->Enter Bill last month- Computable from IPP data |
| NUM_ESTIMATES | Number of times customer created estimates- Computable from IPP data |
| NUM_PURCHASE_ORDERS | Number of times customer created purchase orders- Computable from IPP data |
| NUM_PREF_CHANGED | Number of changes to the preferences. Any change to any preferences. |

*FIG. 6K*

| BMA Data Items (Variable Names used in BMA) | Description |
|---|---|
| NUM_EXPORTED_LISTS | Number of times customer exported to desktop. |
| NUM_SENT_EMAIL_INVITATION | Number of times customer invites another user to use QBO |
| NUM_ITEMS | Number of times customer added items last month. |
| LOGO_ADDED | Whether the customer added logo or not. |
| NUM_RECONCILED | Number of times customer used reconciled function to reconcile bank transactions. |
| NUM_CREDIT_CARDS | Number of credit card sales used last month- Computable from IPP data |
| NUM_GENERAL_JOURNALS | Number of general journal entries made last month- Computable from IPP data |
| NUM_CREDIT_CARD_CREDITS | Number of credit card credits made last month- Computable from IPP data |
| NUM_BILL_CREDITS | Number of bill credits made last month- Computable from IPP data |
| NUM_CHARGE_CREDITS | Number of charge credits made last month- Computable from IPP data |
| NUM_BILL_CHECKS | Number of bills paid by check- Computable from IPP data |
| NUM_BILL_CREDIT_CARDS | Number of bills paid by credit card- Computable from IPP data |
| NUM_CHARGES | Number of times customer created Charges (Customer->Charges)- Computable from IPP data |
| NUM_TRANSFERS | Number of times customer saved Transfers (Banking->Transfers)- Computable from IPP data |
| NUM_REIMB_CHARGES | Number for reimbursed charges- Computable from IPP data- Computable from IPP data |
| NUM_TIME_CHARGES | Number of times charged for time (rather than goods)- Computable from IPP data- Computable from IPP data |
| NUM_CASH_PURCHASES | Number of times customer saved cash purchases- Computable from IPP data- Computable from IPP data |
| NUM_CASH_SALES | Number of times customer saved cash sales- Computable from IPP data- Computable from IPP data |
| NUM_CREDIT_MEMOS | Number of times customer saved credit memos- Computable from IPP data- Computable from IPP data |
| NUM_CREDIT_REFUNDS | Number of times customer saved credit refunds- Computable from IPP data- Computable from IPP data |

*FIG. 6L*

| BMA Data Items (Variable Names used in BMA) | Description |
|---|---|
| NUM_TAX_PAYMENTS | Number of tax payments made- Computable from IPP data- Computable from IPP data |
| NUM_PAYROLL_REFUNDS | Number of payroll refunds- Computable from IPP data- Computable from IPP data |
| NUM_VENDORS | Number of times customer added vendors last month- Computable from IPP data |
| NUM_DEPARTMENTS | Number of departments |
| NUM_TRANSACTIONS | Number of transactions- Computable from IPP data |
| NUM_STATEMENTS | Number of times customer created (saved) statements. (Customer->Statements) |
| NUM_USERS | Number of users invited, during last month |
| NUM_BUDGETS | Number of times customer created budgets last month. |
| NUM_OLB_FINANCIAL_INSTITUTIONS | Number of FI's connected- Computable from IPP data |
| NUM_REMINDERS | Number of reminders that are currently set last month. |
| NUM_INVENTORY_QTY_ADJMTS | Number of inventory quantity adjustments- Computable from IPP data |
| NUM_OLB_MANUAL | Number of OLB manual download, undo txns, accept suggestions. |
| NUM_OLB_SETUP | Number of OLB accounts set up |
| NUM_OLB_DISABLE | Number of times disables OLB accounts |
| NUM_OLB_AUTO | Number of OLB automatic download |
| NUM_OLB_ACCEPT | Number of times accepted OLB suggestions. |
| NUM_EMAILED_INVOICES | Number of invoices emailed |
| NUM_EMAILED_STATEMENTS | Number of statements emailed |
| NUM_UPLOAD_FILES | Number of files uploaded as attachment (e.g., attach file to an Invoice) |
| EMS_FLAG | Flag indicating whether company uses an EMS product (payroll) |
| PSD_FLAG | Flag indicating whether company uses a PSD product (payments) |
| EQUITY_2012 | Company equity as of Dec 31, 2012- Computable from IPP data |
| EQUITY_2011 | Company equity as of Dec 31, 2011- Computable from IPP data |
| EQUITY_2010 | Company equity as of Dec 31, 2010- Computable from IPP data |
| EQUITY_2009 | Company equity as of Dec 31, 2009- Computable from IPP data |
| CCLIABILITY_2012 | Credit card liability as of Dec 31, 2012- Computable from IPP data |

*FIG. 6M*

| BMA Data Items (Variable Names used in BMA) | Description |
|---|---|
| CCLIABILITY_2010 | Credit card liability as of Dec 31, 2010- Computable from IPP data |
| CCLIABILITY_2009 | Credit card liability as of Dec 31, 2009- Computable from IPP data |
| INC_2012_07 | Income in July, 2012- Computable from IPP data |
| INC_2012_06 | Income in June, 2012- Computable from IPP data |
| INC_2012_05 | Income in May, 2012- Computable from IPP data |
| INC_2012_04 | Income in April, 2012- Computable from IPP data |
| Perc_Diff_equity_2012 | Percent difference in equity in 2012 from 2011- Computable from IPP data |
| Perc_Diff_equity_2011 | Percent difference in equity in 2011 from 2010- Computable from IPP data |
| Perc_Diff_equity_2010 | Percent difference in equity in 2010 from 2009- Computable from IPP data |
| Perc_Diff_CC_2012 | Percent difference in credit card liability in 2012 from 2011- Computable from IPP data |
| Perc_Diff_CC_2011 | Percent difference in credit card liability in 2011 from 2010- Computable from IPP data |
| Perc_Diff_CC_2010 | Percent difference in credit card liability in 2010 from 2009- Computable from IPP data |
| Perc_Diff_inc_07 | Percent difference in income in July from June - Computable from IPP data |
| Perc_Diff_inc_06 | Percent difference in income in June from May- Computable from IPP data |
| Perc_Diff_inc_05 | Percent difference in income in May from June- Computable from IPP data |

INSTANT LENDING DECISIONS

CROSS-REFERENCE TO RELATED APPLICATIONS

This application is a continuation application of U.S. patent application Ser. No. 13/956,281, which filed on Jul. 31, 2013. Accordingly, this application claims benefit under 35 U.S.C. § 120 from U.S. patent application Ser. No. 13/956,281. U.S. patent application Ser. No. 13/956,281 is hereby incorporated by reference in its entirety.

BACKGROUND

Banks often have trouble lending to a small business because they do not have an effective approach to assess the quality of a small business, and often default to using the small business proprietor's credit scores.

SUMMARY

In general, in one aspect, the invention relates to a method for generating a risk profile of a business entity. The method includes obtaining user entered data from a business management application (BMA) used by a plurality of business entities comprising the business entity, wherein the user entered data is entered by the business entity and represents a first measure of business activities performed by the business entity, obtaining usage statistics from the BMA, wherein the usage statistics represents how the business entity uses the BMA, analyzing, by a computer processor and using an adaptively-determined matching algorithm, at least the user entered data and the usage statistics to generate the risk profile, wherein the risk profile is among a plurality of risk profiles of the plurality of business entities and represents a probability of the business entity to default on a loan, providing the plurality of risk profiles to a first lender for making a plurality of lending decisions with respect to the plurality of business entities, analyzing, by the computer processor, approval statistics of the plurality of lending decisions in relationship to the plurality of risk profiles to generate a first correlation, and adjusting, by the computer processor, the adaptively-determined matching algorithm to increase the first correlation.

In general, in one aspect, the invention relates to a system for generating a risk profile of a business entity. The system includes (i) a computer processor, (2) a business management application (BMA) configured to obtain and store user entered data and a plurality of usage statistics, (3) memory storing instructions executable by the processor, wherein the instructions includes (i) a risk profile generator configured to obtain user entered data from the BMA used by a plurality of business entities comprising the business entity, wherein the user entered data is entered by the business entity and represents a first measure of business activities performed by the business entity, obtain the plurality of usage statistics from the BMA, wherein the plurality of usage statistics represents how the business entity uses the BMA, analyze, using an adaptively-determined matching algorithm, at least the user entered data and the plurality of usage statistics to generate the risk profile, wherein the risk profile is among a plurality of risk profiles of the plurality of business entities and represents a probability of the business entity to default on a loan, and provide the plurality of risk profiles to a first lender for making a plurality of lending decisions with respect to the plurality of business entities, and (ii) an adaptive matching analyzer configured to analyze approval statistics of the plurality of lending decisions in relationship to the plurality of risk profiles to generate a correlation, and adjust the adaptively-determined matching algorithm to increase the correlation, and (4) a repository configured to store the plurality of risk profiles.

In general, in one aspect, the invention relates to a non-transitory computer readable medium storing instructions for generating a risk profile of a business entity. The instructions, when executed by a computer processor, include functionality for obtaining user entered data from a business management application (BMA) used by a plurality of business entities comprising the business entity, wherein the user entered data is entered by the business entity and represents a first measure of business activities performed by the business entity, obtaining usage statistics from the BMA, wherein the usage statistics represents how the business entity uses the BMA, analyzing, using an adaptively-determined matching algorithm, at least the user entered data and the usage statistics to generate the risk profile, wherein the risk profile is among a plurality of risk profiles of the plurality of business entities and represents a probability of the business entity to default on a loan, providing the plurality of risk profiles to a first lender for making a plurality of lending decisions with respect to the plurality of business entities, analyzing approval statistics of the plurality of lending decisions in relationship to the plurality of risk profiles to generate a first correlation, and adjusting the adaptively-determined matching algorithm to increase the first correlation.

Other aspects of the invention will be apparent from the following description and the appended claims.

BRIEF DESCRIPTION OF DRAWINGS

FIGS. 5A, 5B, 5C, 5D, 5E, 5F, 5G, 5H, 5I, 5J, 5K, and 5L show Table 1 in accordance with one or more embodiments.

FIGS. 6A, 6B, 6C, 6D, 6E, 6F, 6G, 6H, 6I, 6J, 6K, 6L, 6M, and 6N show Table 2 in accordance with one or more embodiments.

DETAILED DESCRIPTION

Figure 1:
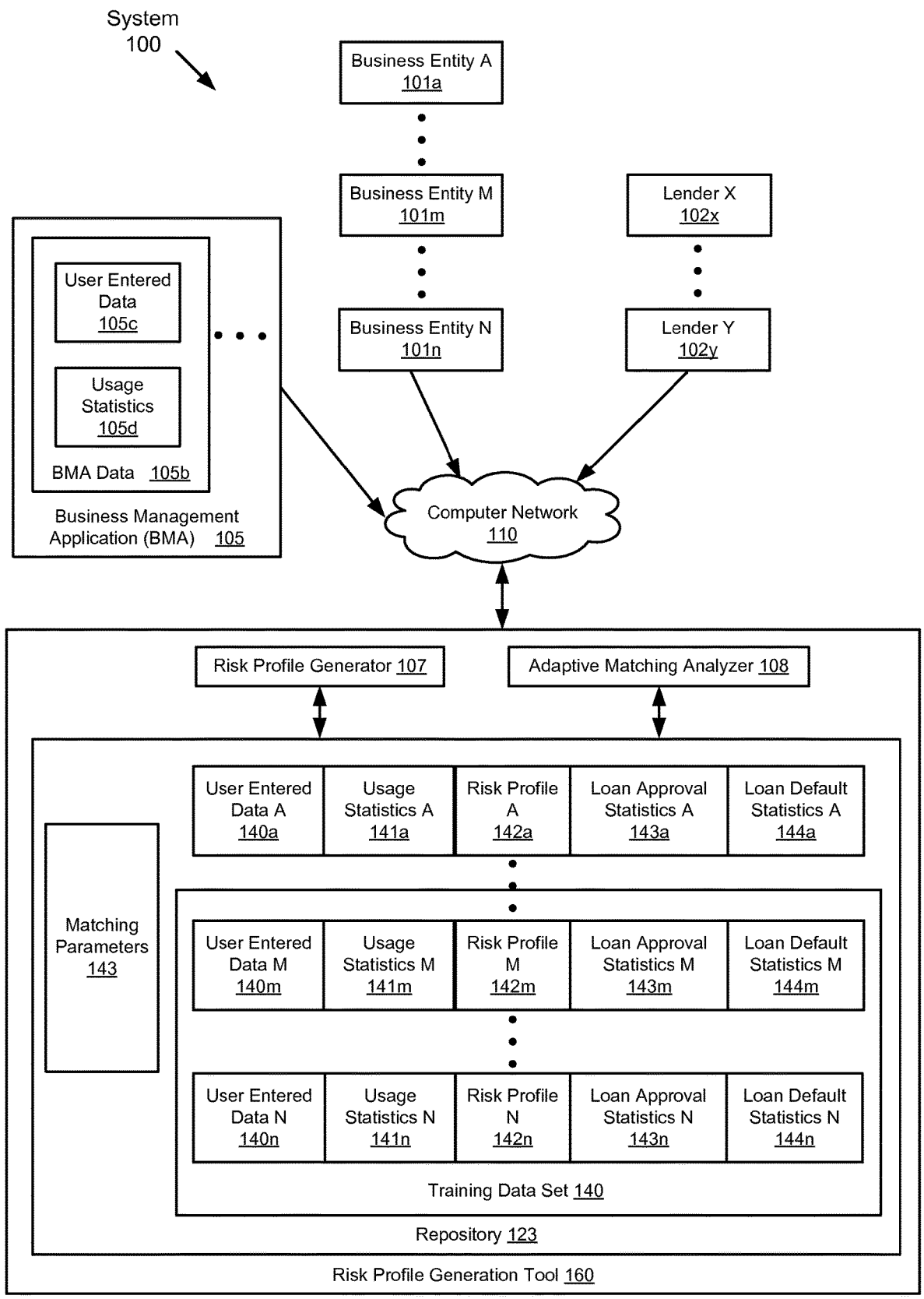
FIG. 1 shows a block diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, system, and computer readable medium to generate a risk profile of a small business (SMB) based on accounting data and other third party business management application (BMA) data of the SMB. In particular, the accounting data and other third party BMA data are retrieved from a business management application (e.g., accounting application, payroll application, tax preparation application, personnel application, etc.) as a software-as-an-service (SaaS) used by the SMB. Specifically, the risk profile represents the likelihood of the SMB to be delinquent and/or to default on a loan. In one or more embodiments, the risk profile is provided to a lender for making an expedient lending decision with respect to the SMB. In one or more embodiments, statistics of lenders' lending decisions based on provided risk profiles are analyzed to generate a correlation. Accordingly, the algorithm(s) used to generate the risk profile from the accounting data and other third party BMA data are adjusted to maximize the correlation.

FIG. 1 shows a block diagram of a system (100) for generating a risk profile based on third party BMA data for instant lending decisions in accordance with one or more embodiments of the invention. Specifically, the system (100) includes business entities (e.g., business entity A (101a)), lenders (e.g., lender X (102x)), a BMA (105) used by the business entities, and a risk profile generation tool (160) that are coupled via a computer network (110). In one or more embodiments of the invention, the risk profile generation tool (160), or a portion thereof, may be integrated with the BMA (105). In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1.

In one or more embodiments of the invention, the computer network (110) may include a cellular phone network, a wide area network, a local area network, a public switched telephone network (PSTN), or any other suitable network that facilitates the exchange of information from one part of the network to another. In one or more embodiments, the computer network (110) is coupled to or overlaps with the Internet.

In one or more embodiments, each of the business entities (e.g., business entity A (101a), business entity M (101m), business entity N (101n)), the lenders (e.g., lender X (102x), lender Y (102y)), the BMA (105), and the risk profile generation tool (160) may include any computing device configured with computing, data storage, and network communication functionalities. In one or more embodiments, the BMA (105) may be an accounting application, a tax preparation application, a payroll application, a personnel application, or any business management application. In one or more embodiments, the BMA (105) is provided by an application service provider, such as a software as a service (SaaS). For example, the BMA (105) may be operated by the application service provider (ASP) and accessed by the business entities (e.g., business entity A (101a), business entity M (101m), business entity N (101n)) on a subscription basis.

In one or more embodiments, BMA data (e.g., BMA data (105b) including user entered data (105c) and usage statistics (105d) of the business entity A (101a)) is generated in response to the business entities accessing the BMA (105). For example, the user entered data (105c) may include profile/configuration information specified by the business entity A (101a). In particular, such profile/configuration information may be entered into the BMA (105) by a user associated with the business entity A (101a), who may be an employee, a consultant, a business owner, etc. of the business entity A (101a). In one or more embodiments, at least a portion of the user entered data (105c) represents a measure of business activities performed by the business entity A (101a). In addition, the usage statistics (105d) may include statistics or other behavioral information representing how the BMA (105) is used by the business entity A (101a). Examples of the BMA data (105b) are shown in TABLE 1 and TABLE 2 below. In particular, TABLE 1, shown in FIGS. 5A, 5B, 5C, 5D, 5E, 5F, 5G, 5H, 5I, 5J, 5K, and 5L, lists a number of example BMA data each corresponding to a category of BMA data items. TABLE 2, shown in FIGS. 6A, 6B, 6C, 6D, 6E, 6F, 6G, 6H, 6I, 6J, 6K, 6L, 6M, and 6N, provides definitions of each BMA data item. Although the BMA data (e.g., BMA data (105b)) is shown in FIG. 1 as stored within the BMA (105), in one or more embodiments, the BMA data (e.g., BMA data (105b)) may not persist within the BMA (105). In one or more embodiments, the user entered data (105c) and usage statistics (105d) of the business entity A (101a) are stored in a repository (123) of the risk profile generation tool (160) as the user entered data A (140a) and usage statistics A (141a). Similarly, the BMA data (105b) of the business entity M (101m) and business entity N (101n) may also be stored in the repository (123) as the user entered data M (140m)/usage statistics M (141m) and user entered data N (140n)/usage statistics N (141n), respectively. For example, information stored in the user entered data A (140a)/usage statistics A (141a), user entered data M (140m)/usage statistics M (141m), and user entered data N (140n)/usage statistics N (141n) may be retrieved and used by the risk profile generation tool (160), as needed, instead of persisting within the BMA (105).

As shown in FIG. 1, the risk profile generation tool (160) includes a risk profile generator (107), an adaptive matching analyzer (108), and the repository (123) storing information used and/or generated by the risk profile generator (107) and the adaptive matching analyzer (108).

In one or more embodiments, the risk profile generator (107) is configured to obtain the BMA data (105b) from the BMA (105) for storing in the repository (123). For example, the user entered data (105c)/usage statistics (105d) included in the BMA data (105b) may be stored as the user entered data A (140a) and usage statistics A (141a) in the repository (123). Similarly, other BMA data (105b) associated with the business entity M (101m) and business entity N (101n) may be stored as the user entered data M (140m)/usage statistics M (141m) and user entered data N (140n)/usage statistics N (141n), respectively in the repository (123).

In one or more embodiments, the user entered data A (140a)/usage statistics A (141a), user entered data M (140m)/usage statistics M (141m), and user entered data N (140n)/usage statistics N (141n) are analyzed by the risk profile generator (107) to generate the risk profile A (142a) of the business entity A (101a), the risk profile M (142m) of the business entity M (101m), and the risk profile N (142n) of the business entity N (101n), respectively. Specifically, the risk profile A (142a), risk profile M (142m), and risk profile N (142n) represent a predicted probability of the business entity A (101a), business entity M (101m), and business entity N (101n), respectively, to be delinquent on any loan payment or to default on a loan. In one or more embodiments, the risk profile (e.g., risk profile A (142a), risk profile M (142m), and risk profile N (142n)) includes one or more of a probability of default, a probability of non-default, a probability of delinquency, a probability of non-delinquency, a probability of loan approval, and a probability of loan declination, each represented by a number score, a percentage score, a letter score, or other suitable type of score. For example, payment delinquency (i.e., late payment) and/or loan default (i.e., late payment exceeding a pre-determined duration and/or frequency) may occur when the loan is serviced by one of the lenders (e.g., lender X (102x), lender Y (102y)) or a loan service entity associated with these lenders.

In one or more embodiments, the risk profiles (e.g., the risk profile A (142a), risk profile M (142m), risk profile N (142n)) are generated by the risk profile generator (107) using an adaptively-determined matching algorithm such that the risk profiles correlate with actual occurrences of payment delinquency and/or loan default by the corresponding business entities (e.g., business entity A (101a), business entity M (101m), business entity N (101n)) as borrowers, for example during a particular time period. Accordingly, these risk profiles also indicate probabilities that future payment delinquency and/or loan default by the corresponding business entities may also occur. Generally, actual occurrences of payment delinquency and/or loan default by the borrowers are tracked and compiled by lenders (e.g., lender X (102x), lender Y (102y)) as loan delinquency statistics. In one or more embodiments, these loan delinquency statistics are obtained by the risk profile generator (107) and stored in the repository (123) as loan default statistics A (144a), loan default statistics M (144m), and loan default statistics N (144n) corresponding to the business entity A (101a), business entity M (101m), and business entity N (101n), respectively. Note that each of the loan default statistics A (144a), loan default statistics M (144m), and loan default statistics N (144n) may be compiled over the same time period for some business entities (e.g., business entity M (101m), business entity N (101n)) and compiled or over different time periods for other business entities (e.g., business entity A (101a)).

In one or more embodiments, the aforementioned adaptively-determined matching algorithm includes a machine learning algorithm, such as a rule ensemble algorithm known to those skilled in the art. For example, the risk profile A (142a) may be generated by the risk profile generator (107) using the machine learning algorithm that has been trained based on risk-profile-to-loan-default correlation of other business entities. As shown in FIG. 1, the risk profile M (142m), risk profile N (142n), loan default statistics M (144m), and loan default statistics N (144n) are generated/obtained prior to generating the risk profile A (142a) and are used as part of a training data set (140) for iteratively adjusting the machine learning algorithm before generating the risk profile A (142a) therewith. "Iteratively adjusting" is referred to as "training" in the context of machine learning algorithm. In one or more embodiments, the risk profile generator (107) is configured to iteratively adjust (i.e., train) the adaptively-determined matching algorithm during a training phase by at least (i) providing, during an initial iteration of the training phase, the risk profile M (142m) and risk profile N (142n), among other risk profiles in the training data set (140) to one or more lenders (e.g., lender X (101x), lender Y (101y)) for making lending decisions (e.g., approved or declined), such as represented by the loan approval status M (143m), loan approval status N (143n), etc. with respect to the respective business entity M (101m), business entity N (101n), etc., (ii) obtaining the loan default statistics M (144m), loan default statistics N (144n), etc. in response to these lending decisions leading to an approval and initiation of the loans for the business entity M (101m), business entity N (101n), etc., (iii) analyzing the loan default statistics M (144m), default statistics N (144n), etc. in relationship to the risk profile M (142m), risk profile N (142n), etc. to generate a risk-profile-to-loan-default correlation, and (iv) adjusting, prior to a subsequent iteration of the training phase, the matching parameters (143) of the adaptively-determined matching algorithm to increase (e.g., optimize or maximize) the risk-profile-to-loan-default correlation for the subsequent iteration of the training phase.

In one or more embodiments, the training data set (140) may further include the corresponding user entered data, usage statistics, and loan approval statistics. In one or more embodiments, in response to a pre-determined result of iteratively adjusting (i.e., training) the adaptively-determined matching algorithm based on the training data set (140), the risk profile generator (107) is configured to analyze the user entered data A (140a) and the usage statistics A (141a), using the adjusted adaptively-determined matching algorithm, to generate the risk profile A (142a) of the business entity A (101a). For example, the pre-determined result may include an incremental change in the risk-profile-to-loan-default correlation between two contiguous iterations of the training phase being less a pre-determined amount (e.g., less than 0.1% of the final risk-profile-to-loan-default correlation). In other words, the matching parameters (143) may be iteratively adjusted until any incremental percentage improvement of the risk-profile-to-loan-default correlation is less than 0.1% before the adaptively-determined matching algorithm is used to analyze the user entered data A (140a) and the usage statistics A (141a) for generating the risk profile A (142a) of the business entity A (101a).

In one or more embodiments, once generated, the risk profile A (142a) is provided by the risk profile generator (107) to the business entity A (101a). Accordingly, the business entity A (101a) may submit the risk profile A (142a) to one or more lenders (e.g., lender X (102x), lender Y (102y)) to apply for a loan. If such loan application is approved and initiated, the corresponding loan servicing history may be tracked for compiling the payment delinquency and/or default statistics to generate the loan default statistics A (144a) associated with the business entity A (101a). In one or more embodiments, the user entered data A (140a), the usage statistics A (141a), the risk profile A (142a), the corresponding loan approval status A (143a), and the resultant loan default statistics A (144a) may be further included in the training data set (140) to generate an updated version of the training data set (140). Subsequently, this updated version of the training data set (140) may be used to generate additional risk profiles for other business entities and/or to update existing risk profiles (e.g., the risk profile A (142a), risk profile M (142m), risk profile N (142n), etc.) as references for future loan applications.

In one or more embodiments, the matching parameters (143) of the adaptively-determined matching algorithm are further adjusted to maximize the correlation between the risk profiles (e.g., the risk profile A (142a), risk profile M (142m), risk profile N (142n), etc.) and the corresponding loan approval status (e.g., loan approval status A (143a), loan approval status M (143m), loan approval status N (143n)). In one or more embodiments, the adaptive matching analyzer (108) is configured to analyze approval statistics in relationship to the risk profiles to generate a risk-profile-to-loan-approval correlation, which is maximized during the training phase of the adaptively-determined matching algorithm by adjusting the matching parameters (143).

Returning to the discussion of the risk profile generator (107), in one or more embodiments, the risk profile generator (107) is further configured to generate a loan proposal based on similar risk profiles shared by a group of business entities. Such loan proposal may then be sent to one or more lenders that may be interested in initiating loans based on the anticipated risk/return characteristics represented by such loan proposal. Details of generating the loan proposal based on similar risk profiles shared by a group of business entities are described in reference to FIG. 2 below.

In one or more embodiments, the risk profile generator (107) is further configured to identify a group of business entities matching a target risk profile requested by a lender. Details of identifying business entities matching a target risk profile are described in reference to FIG. 2 below.

Figure 2:
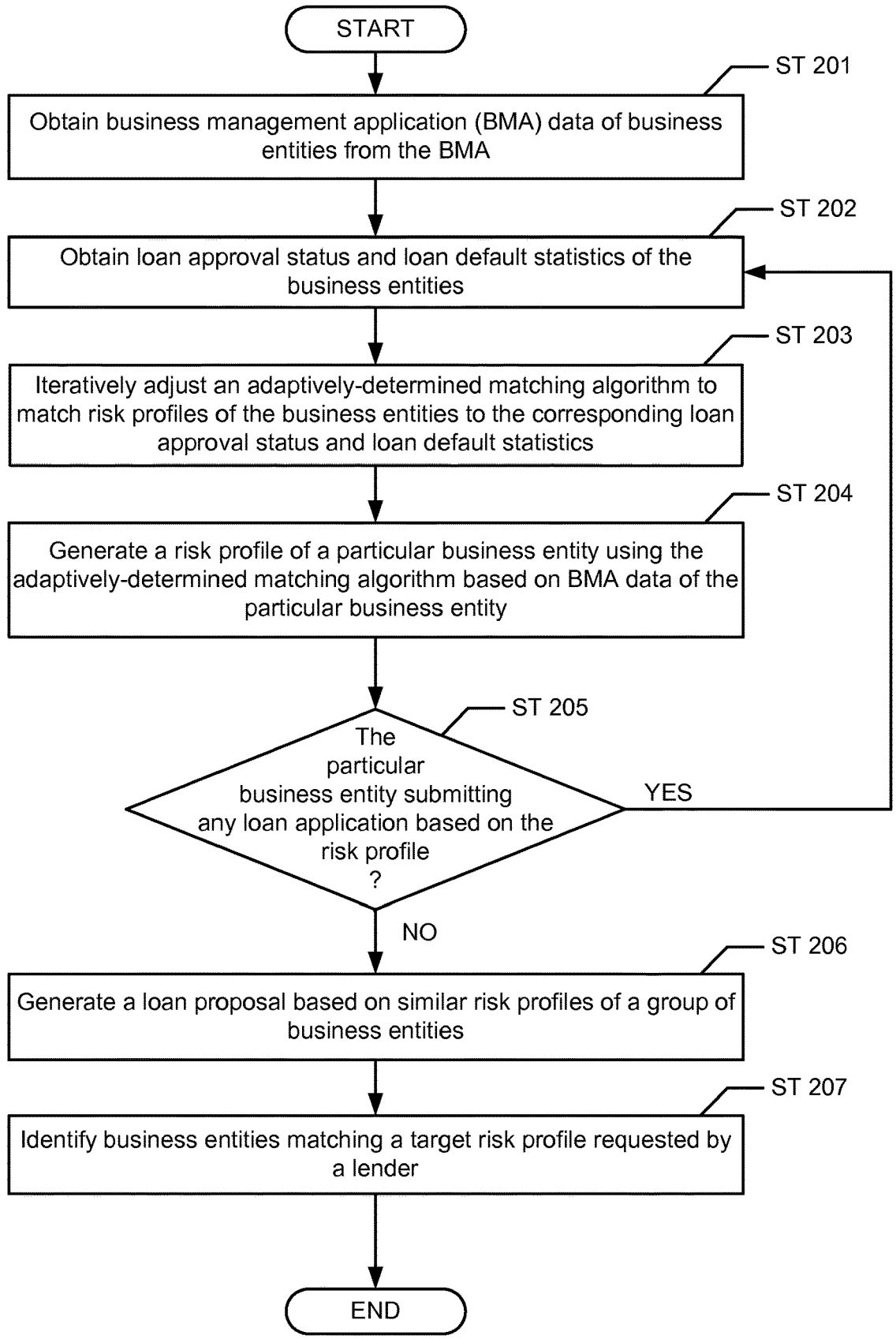
FIG. 2 shows a flow chart of a method in accordance with one or more embodiments of the invention.

FIG. 2 shows a flow chart for generating a risk profile based on third party business management application data for instant lending decision in accordance with one or more embodiments of the invention. In one or more embodiments of the invention, the method of FIG. 2 may be practiced using the system (100) described in reference to FIG. 1 above. In one or more embodiments of the invention, one or more of the steps shown in FIG. 2 may be omitted, repeated, and/or performed in a different order than that shown in FIG. 2. Accordingly, the specific arrangement of steps shown in FIG. 2 should not be construed as limiting the scope of the invention.

Initially in Step 201, business management application (BMA) data of business entities is obtained from the BMA. In one or more embodiments, the BMA may be an accounting application, a tax preparation application, a payroll application, a personnel application, or any business management application. In one or more embodiments, the BMA is provided by an application service provider, such as a software as a service (SaaS). For example, the BMA may be operated by the application service provider (ASP) and accessed by the business entities on a subscription basis. In one or more embodiments, the BMA data include user entered data and usage statistics described in reference to TABLE 1 above.

In Step 202, loan approval status and loan default statistics of the business entities are obtained from lenders providing loans to the business entities. Generally, business entities apply for business loans from such lenders who may approve or decline the loan application. For those loan applications that are approved, actual occurrences of loan payment delinquency and loan default are tracked and compiled by the lenders as loan default statistics. In one or more embodiments, the loan approval status and loan default statistics of the business entities are obtained from the lenders based on certain business agreements. For example, the business entities may have the ability to opt-in as part of the loan application to release such information to business partners of the lenders.

In Step 203, an adaptively-determined matching algorithm is iteratively adjusted to match risk profiles of the business entities to the corresponding loan approval status and loan default statistics. In one or more embodiments, the risk profile includes one or more of a probability of default, a probability of non-default, a probability of delinquency, a probability of non-delinquency, a probability of loan approval, and a probability of loan declination, each represented by a number score, a percentage score, a letter score, or other suitable type of score.

In one or more embodiments, the risk profiles are modeled as a function of the BMA data of the business entities using the adaptively-determined matching algorithm. In other words, the adaptively-determined matching algorithm is used to analyze the BMA data and generate the corresponding risk profiles. In one or more embodiments, the adaptively-determined matching algorithm includes a machine learning algorithm, such as a rule ensemble algorithm known to those skilled in the art. For example, the training data set of the machine learning algorithm includes the BMA data, loan approval statistics, and loan default statistics of the business entities. Accordingly, various parameters of the machine learning algorithm are iteratively adjusted during a training phase to match the modeled risk profile (e.g., predicted loan approval/declination, predicted loan delinquency, and predicted loan default) to the actual loan approval status and actual loan default statistics in the training data set. Iteratively adjusting the parameters of the machine learning algorithm is referred to as "training" the machine learning algorithm. For example, training the machine learning algorithm may be as described in reference to the risk profile generator (107) depicted in FIG. 1 above.

In Step 204, subsequent to the training phase of the adaptively-determined matching algorithm the adaptively-determined matching algorithm is used to generate the risk profile of a particular business entity based on the BMA data of the particular business entity. In one or more embodiments, this particular business entity is one of the business entities whose BMA data are included in the training data set of the adaptively-determined matching algorithm. In such embodiments, the risk profile generated in the Step 204 is a updated version of a previous risk profile of this particular business entity that was used as part of the training set in the Step 203. In one or more embodiments, this particular business entity is separate from those other business entities whose BMA data are included in the training data set of the adaptively-determined matching algorithm.

In Step 205, a determination is made as to whether the particular business entity uses the risk profile to apply for a loan. If the determination is YES, i.e., the particular business entity submit a loan application based on the risk profile generated in Step 204, the method returns to Step 202 where loan approval status and any subsequent loan default statistic are added to the training data set of the adaptively-determined matching algorithm. If the determination is NO, i.e., the particular business entity has not submitted any loan application based on the risk profile generated in Step 204, the method proceeds to Step 206.

In Step 206, a loan proposal is generated based on similar risk profiles of a group of business entities. In one or more embodiments, a cluster of similar risk profiles are extracted from a risk profile collection using a pre-determined clustering algorithm and based on a pre-determined similarity measure. Accordingly, a loan proposal is generated based on the cluster of similar risk profiles. For example, the loan proposal may include a range of loan amounts, interest rate terms, maturity time period, borrower covenants, and other conventional financial parameters of a loan. In one or more embodiments, a statistical return for a lender is computed for the loan proposal based on characteristics (e.g., probability of default, probability of non-default, etc. each represented by a number score, a percentage score, a letter score, etc.) of the similar risk profiles in the cluster. For example, an effective average rate of return for a simple example loan proposal may be computed by deducting a defaulted loan amount multiplied by the probability of default from the anticipated interest collection of a non-defaulted loan amount multiplied by a simple fixed rate and the probability of non-default over the maturity time period.

In one or more embodiments, the loan proposal is presented to one or more lenders and the group of business entities corresponding to the cluster of similar risk profiles. For example, a lender may decide to offer a loan program based on the loan proposal. In another example, the group of business entities may jointly request a loan program from a lender based on the loan proposal.

In Step 207, a target risk profile specified by one or more lenders may be matched to business entities sharing similar risk profiles. In one or more embodiments, one or more clusters of similar risk profiles are extracted from a risk profile collection using a pre-determined clustering algorithm and based on a pre-determined similarity measure. In addition, at least one of these clusters is selected as being similar to the target risk profile. Accordingly, a list of business entities corresponding to the selected at least one cluster are presented to the one or more lenders. For example, a lender may decide to offer a loan program based on the target risk profile and market the loan program to the business entities on the list.

Figure 3:
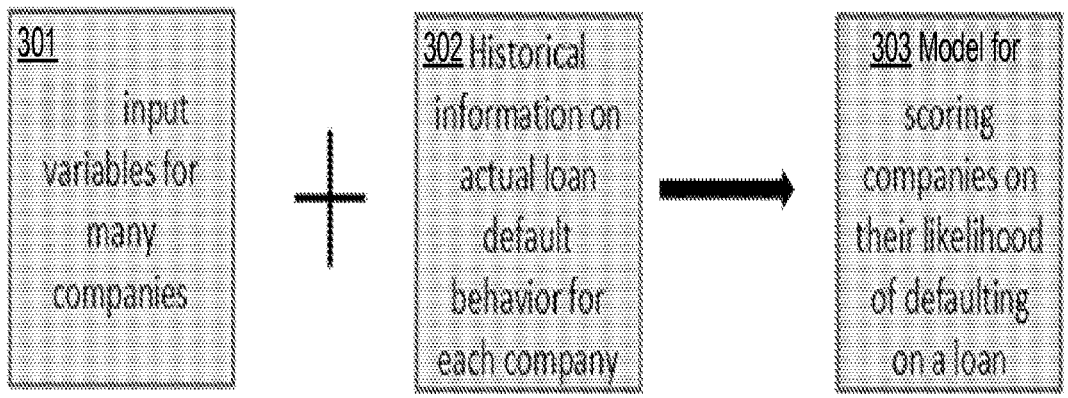
FIG. 3 shows an example in accordance with one or more embodiments of the invention.
Figure 3:
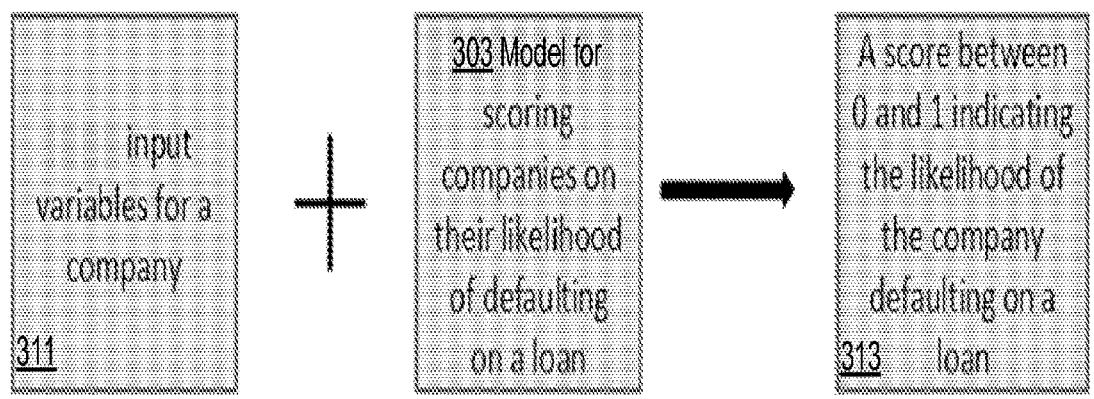

FIG. 3 shows an example flow (300) of generating a risk profile based on third party business management application data for instant lending decision in accordance with one or more embodiments of the invention. Specifically, the flow (300) uses business management application (BMA) data to build a model (303) to predict delinquent behavior with a training data set. As shown in FIG. 3, the flow (300) uses both user-entered data and usage/behavioral data of the BMA data (301) to predict whether a company has defaulted on a loan or has been past due at some point during the life of the loan. The training data set includes a large number (e.g., hundreds) of companies for whom historical delinquent status (302) on a loan are known. Further, a large number of user-entered data and usage/behavioral data (e.g., over one hundred) are included for each company in the training set.

A rule ensemble algorithm is used to build the predictive model (303) that is used to score a company on its likelihood of exhibiting delinquent behavior. A "rules ensemble" is a particular form of the machine learning methodology referred to as "ensembling," where multiple simple models (base learners) are combined into one complex model to improve accuracy. This type of model can be described as an additive expansion of the form $F(x)=a_0+a_1*b_1(x)+a_2*b_2(x)+ \ldots +a_M*b_M(x)$ where the $b_j(x)$'s are the base-learners and x is a vector $[x_1, x_2, \ldots x_N]$ representing the BMA data items (301). As noted above, N is a large number, such as a number over one hundred.

In the case of a rules ensemble, the $b_j(x)$ terms are conjunctive rules of the form "if $x_1$>22 and $x_2$>27 then 1 else 0" or linear functions of a single variable—e.g., $b_j(x)=x_j$. Using base-learners of this type is efficient because they constitute easily interpretable statements about attributes $x_j$. They also preserve the desirable characteristics of Decision Trees such as efficient handling of categorical attributes, robustness to outliers in the distribution of x, etc.

The example rules ensemble used in the flow (300) builds a model (303), represented as F(x), in a three-step process:
 a. Build a tree ensemble (one where the $b_j(x)$'s are decision trees),
 b. Generate candidate rules from the tree ensemble, and
 c. Fit coefficients $a_j$ via regularized regression.

The BMA data items are categories into several types of variables and are evaluated to see which are most predictive of default risk. These variable types include:
 a. Raw QBO user-entered data (e.g., transactions, number of customers, . . . ),
 b. BMA usage behavior (e.g., browser used, number of logins, length of time a QBO customer, . . . ),
 c. Computed financial-health variables (e.g., net worth, EBITDA, inventory days turnover, . . . ), and
 d. Summary data (e.g., total capital dollar amount coming in to the company, total dollar amount going out of the company, number of distinct vendors paid in last 12 months, . . . ).

For example, the following BMA data items are selected from the above variable types as the most predictive power (based on the training data set):
 a. Current ratio (current assets/current liabilities),
 b. Year-over-year sales growth,
 c. Number of online banking automatic downloads in a given month,
 d. Number of transactions with money leaving the company (e.g., bills paid) in a given month,
 e. Whether the company is a current BMA subscriber or not, and
 f. Whether the company is a customer for financial supplies (e.g., checks, accounting forms, etc.) or not.

The output result of the model (303) includes a risk score (313) from 0 to 1 that may be interpreted as the probability that the company may default on a loan, the probability that the company may be delinquent for one or more payments, and/or the probability the company may be approved by a particular lender. Specifically, the risk score (313) of a particular company is generated by using the numerous BMA data items (311) of the particular company as input variables of the model (303). The risk score (313) may be used in a number of ways:
 a. Kept in its raw, continuous format to be used in conjunction with other data to make a lending decision by a lender,
 b. By trading off the relative "cost" of incorrectly categorizing a business as risky when it is not, versus incorrectly categorizing a business as not risky when it is, a break point maybe determined where a company above that point is categorized as risky and below is categorized as not risky. Similarly, a number of breakpoints may be determined to create tiers for low, medium, and high risk companies.

The risk score (313) may be given to a lender directly or given to the particular company as a borrower and used at the borrower's discretion when applying for a loan from the lender. In addition, the risk score (313) may be dynamically update in real time during the life of the loan as a leverage for the borrower to negotiate better terms with the lender if the borrower's business is doing well. Further, the risk score (313) may be dynamically update in real time during the life of the loan for the lender to measure the ongoing risk of the loan with respect to the borrower's business reflected by the BMA data of the borrower.

Figure 4:
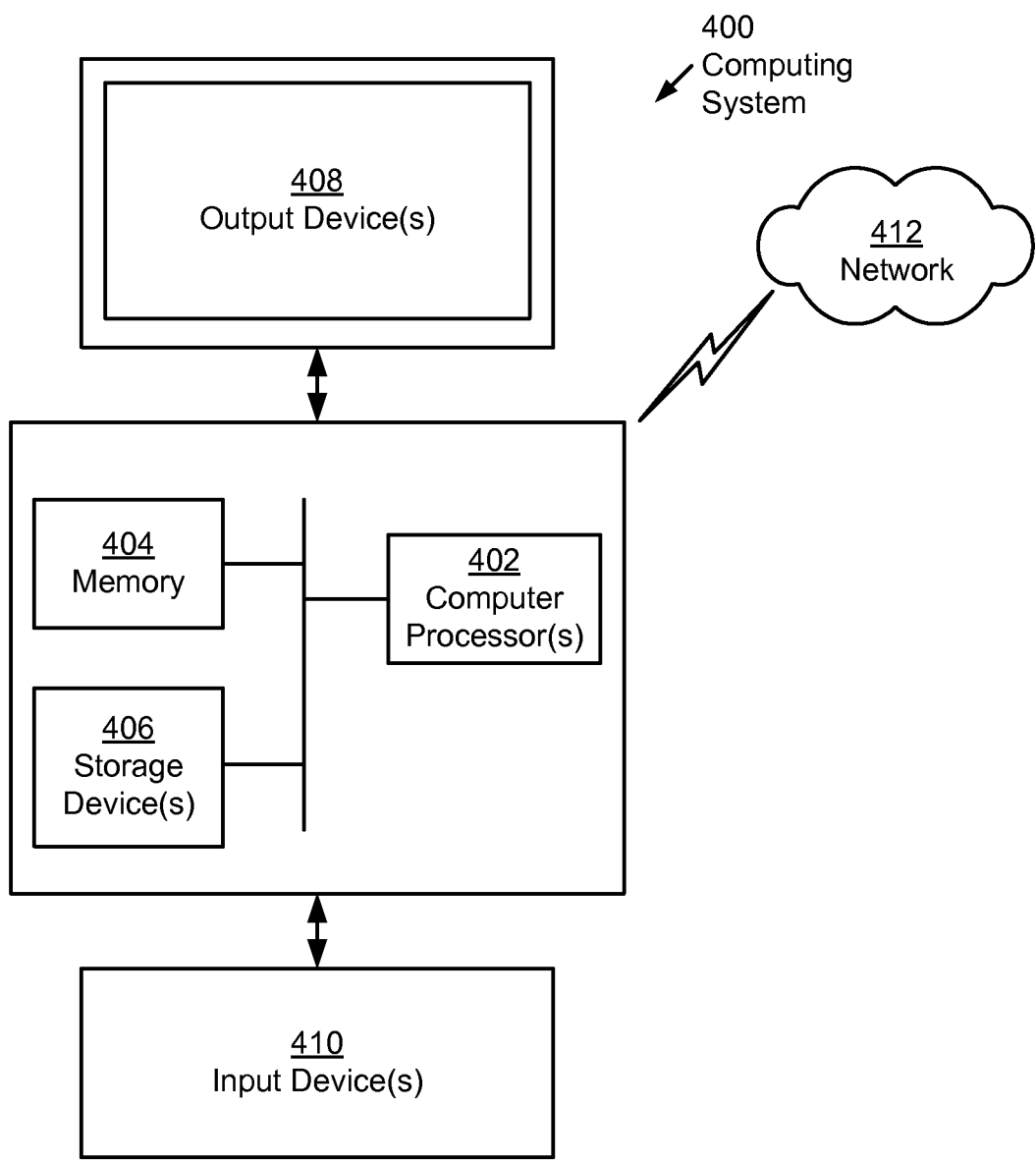
FIG. 4 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   obtaining user entered data from a business management application (BMA) for a plurality of business entities, wherein the user entered data is entered by the plurality of business entities and represents business activities performed by the plurality of business entities;
   obtaining usage statistics from the BMA for the plurality of business entities, wherein the usage statistics comprise login statistics regarding a plurality of logins to the BMA by each of the plurality of business entities;
   analyzing, by a machine learning algorithm, at least the user entered data and the usage statistics to generate a plurality of risk profiles for the plurality of business entities, wherein the plurality of risk profiles represent probabilities of the plurality of business entities defaulting on a loan;
   providing, over a computer network, the plurality of risk profiles to a computing device of a first lender, wherein the computing device of the first lender executes a plurality of lending decisions with respect to the plurality of business entities based on the plurality of risk profiles;
   training the machine learning algorithm by iteratively adjusting, by a computer processor, adjusted matching parameters of the machine learning algorithm to increase a correlation between approval statistics of the plurality of lending decisions and the plurality of risk profiles, wherein iteratively adjusting continues until reaching a threshold correlation between the approval statistics and the plurality of lending decisions and the plurality of risk profiles, wherein training generates an updated machine learning algorithm;
   obtaining, by an application service provider that provides access to the BMA to the plurality of business entities, a number of logins to the BMA by a business entity from among the plurality of business entities; and
   updating, over the computer network and in real time with obtaining the number of logins to the BMA, a risk score of a risk profile for the business entity, wherein the risk score of the risk profile for the business entity is updated using the number of logins to the BMA as inputs to the updated machine learning algorithm.

2. The method of claim 1,
   wherein the user entered data and the usage statistics comprise at least one category selected from a group consisting of business statistics, business financial data, online banking usage statistics, accounting software trial details, marketing interaction data, general setup statistics, payroll setup statistics, customer support data, firmographics, product usage, subscription details, subscription billing details, payroll processing details, attrition details, customer statistics, pattern changes, transaction statistics, chargebacks statistics, and age statistics, and
   wherein the machine learning algorithm comprises a rule ensemble algorithm.

3. The method of claim 1, further comprising:
   obtaining loan default statistics of the plurality of business entities; and
   adjusting, by the computer processor, the machine learning algorithm based on the loan default statistics to increase the correlation.

4. The method of claim 1, further comprising:
   providing the risk profile to the business entity,
   wherein the business entity submits the risk profile to a second lender for the loan application.

5. The method of claim 1, further comprising:
   extracting, using a pre-determined clustering algorithm and based on a pre-determined similarity measure, a cluster of similar risk profiles from the plurality of risk profiles, wherein the cluster of similar risk profiles corresponds to a subset of the plurality of business entities;
   generating a loan proposal based on the cluster of similar risk profiles; and
   presenting the loan proposal to at least one selected from a group consisting of the first lender, a second lender, and the subset of the plurality of business entities.

6. The method of claim 1, further comprising:
obtaining a target risk profile from a second lender;
extracting, based on the target risk profile, a cluster of similar risk profiles from the plurality of risk profiles, wherein the cluster of similar risk profiles corresponds to a subset of the plurality of business entities; and
presenting the cluster of similar risk profiles and the subset of the plurality of business entities to the second lender,
wherein the second lender offers a loan program to the subset of the plurality of business entities.

7. The method of claim 1,
wherein the risk profile comprises at least one selected from a group consisting of a number score, a percentage score, and a letter score.

8. The method of claim 1, wherein the machine learning algorithm is generated by:
building a tree ensemble in which base-learners are decision trees, wherein the base-learners operate on the user entered data obtained from the BMA; and
fitting, via regression, coefficients that scale outputs of the base-learners.

9. A system, comprising:
a computer processor;
memory storing instructions executable by the computer processor, wherein the instructions comprise:
a risk profile generator configured to:
obtain user entered data from a business management application (BMA) for a plurality of business entities, wherein the user entered data is entered by the plurality of business entities and represents business activities performed by the plurality of business entities;
obtain usage statistics from the BMA for the plurality of business entities, wherein the usage statistics comprise login statistics regarding a plurality of logins to the BMA by each of the plurality of business entities;
analyze, using a machine learning algorithm, at least the user entered data and the usage statistics to generate a plurality of risk profiles for the plurality of business entities, wherein the plurality of risk profiles represent probabilities of the plurality of business entities defaulting on a loan; and
provide, over a computer network, the plurality of risk profiles to a computing device of a first lender, wherein the computing device of the first lender executes a plurality of lending decisions with respect to the plurality of business entities based on the plurality of risk profiles;
obtain, by an application service provider that provides access to the BMA to the plurality of business entities, a number of logins to the BMA by a business entity from among the plurality of business entities; and
update, over the computer network and in real time with obtaining the number of logins to the BMA, a risk score of a risk profile for the business entity, wherein the risk score of the risk profile for the business entity is updated using the number of logins to the BMA as inputs to the machine learning algorithm, and
wherein the business entity submits a loan application based on the risk profile, and
an adaptive matching analyzer configured to:
train the machine learning algorithm by iteratively adjusting adjusted matching parameters of the machine learning algorithm to increase a correlation between approval statistics of the plurality of lending decisions and the plurality of risk profiles, wherein iteratively adjusting continues until reaching a threshold correlation between the approval statistics and the plurality of lending decisions and the plurality of risk profiles, wherein training generates an updated machine learning algorithm; and
a repository configured to store the plurality of risk profiles.

10. The system of claim 9,
wherein the user entered data and the usage statistics comprise at least one category selected from a group consisting of business statistics, business financial data, online banking usage statistics, accounting software trial details, marketing interaction data, general setup statistics, payroll setup statistics, customer support data, firmographics, product usage, subscription details, subscription billing details, payroll processing details, attrition details, customer statistics, pattern changes, transaction statistics, chargebacks statistics, and age statistics, and
wherein the machine learning comprises a rule ensemble algorithm.

11. The system of claim 9, wherein the risk profile generator is further configured to:
obtain loan default statistics of the plurality of business entities; and
adjust the machine learning algorithm based on the loan default statistics to increase the correlation.

12. The system of claim 9, wherein the risk profile generator is further configured to:
provide the risk profile to the business entity,
wherein the business entity submits the risk profile to a second lender for the loan application.

13. The system of claim 9, wherein the risk profile generator is further configured to:
extract, using a pre-determined clustering algorithm and based on a pre-determined similarity measure, a cluster of similar risk profiles from the plurality of risk profiles, wherein the cluster of similar risk profiles corresponds to a subset of the plurality of business entities;
generate a loan proposal based on the cluster of similar risk profiles; and
present the loan proposal to at least one selected from a group consisting of the first lender, a second lender, and the subset of the plurality of business entities.

14. The system of claim 9, wherein the risk profile generator is further configured to:
obtain a target risk profile from a second lender;
extract, based on the target risk profile, a cluster of similar risk profiles from the plurality of risk profiles, wherein the cluster of similar risk profiles corresponds to a subset of the plurality of business entities; and
present the cluster of similar risk profiles and the subset of the plurality of business entities to the second lender,
wherein the second lender offers a loan program to the subset of the plurality of business entities.

15. The system of claim 9,
wherein the risk profile comprises at least one selected from a group consisting of a number score, a percentage score, and a letter score.

16. A method, comprising:
obtaining user entered data from an application for a plurality of entities, wherein the user entered data is entered by the plurality of entities and represents activities performed by the plurality of entities;

obtaining usage statistics from the application for the plurality of entities, wherein the usage statistics comprise login statistics regarding a plurality of logins to the application by each of the plurality of entities;

analyzing, by a machine learning algorithm, at least the user entered data and the usage statistics to generate a plurality of profiles for the plurality of entities, wherein the plurality of profiles represent probabilities of the plurality of entities being classified in a category;

providing, over a computer network, the plurality of profiles to a computing device of a first user, wherein the computing device of the first user executes a plurality of decisions with respect to the plurality of entities based on the plurality of profiles; and training the machine learning algorithm by iteratively adjusting, by a computer processor, adjusted matching parameters of the machine learning algorithm to increase a correlation between statistics of the plurality of decisions and the plurality of profiles, wherein iteratively adjusting continues until reaching a threshold correlation between the statistics and the plurality of decisions and the plurality of profiles, wherein training generates an updated machine learning algorithm.

17. The method of claim 16,
wherein the user entered data and the usage statistics comprise at least one category selected from a group consisting of software trial details, interaction data, general setup statistics, support data, firmographics, product usage, subscription details, and pattern changes, and
wherein the machine learning algorithm comprises a rule ensemble algorithm.

18. The method of claim 16, further comprising:
obtaining statistics of the plurality of entities; and
adjusting, by the computer processor, the machine learning algorithm based on the statistics to increase the correlation.

19. The method of claim 16, further comprising:
obtaining, by an application service provider that provides access to the application to the plurality of entities, a number of logins to the application by an entity from among the plurality of entities; and
updating, over the computer network and in real time with obtaining the number of logins to the application, a score of a profile for the entity, wherein the score of the profile for the entity is updated using the number of logins to the application as inputs to the updated machine learning algorithm.

20. The method of claim 16, further comprising:
extracting, using a pre-determined clustering algorithm and based on a pre-determined similarity measure, a cluster of similar profiles from the plurality of profiles, wherein the cluster of similar profiles corresponds to a subset of the plurality of entities;
generating a document based on the cluster of similar profiles; and
presenting the document to at least one of the subset of the plurality of entities.

21. The method of claim 16, further comprising:
obtaining a target profile from a second user;
extracting, based on the target profile, a cluster of similar profiles from the plurality of profiles, wherein the cluster of similar profiles corresponds to a subset of the plurality of entities; and
presenting the cluster of similar profiles and the subset of the plurality of entities to the second user,
wherein the second user submits a document to the subset of the plurality of entities.

22. The method of claim 16,
wherein the profile comprises at least one selected from a group consisting of a number score, a percentage score, and a letter score.

23. The method of claim 16, wherein the machine learning algorithm is generated by:
building a tree ensemble in which base-learners are decision trees, wherein the base-learners operate on the user entered data obtained from the application; and
fitting, via regression, coefficients that scale outputs of the base-learners.

* * * * *